United States Patent [19]
Ives

[11] Patent Number: 5,131,180
[45] Date of Patent: Jul. 21, 1992

[54] LURE AND HOOK SAFETY DEVICE

[76] Inventor: Alan Ives, Rd #5, Box 5464, Moscow, Pa. 18444

[21] Appl. No.: 686,456

[22] Filed: Apr. 17, 1991

[51] Int. Cl.⁵ .................................................. A01K 97/06
[52] U.S. Cl. ........................................ 43/25.2; 43/57.1
[58] Field of Search ............... 43/25.2, 57.1 X, 54.1, 43/55, 25, 26, 4.5

[56] References Cited

U.S. PATENT DOCUMENTS

| | | | |
|---|---|---|---|
| 1,788,674 | 1/1931 | Hughes | 43/57.1 |
| 3,769,741 | 11/1973 | Hessler et al. | 43/57.1 |
| 4,203,245 | 5/1980 | Peterson | 43/25.2 |
| 4,418,490 | 12/1983 | Ancona | 43/25.2 |
| 4,641,454 | 2/1987 | Ray et al. | 43/26 |
| 4,726,141 | 2/1988 | McBride et al. | 43/26 |

Primary Examiner—Richard K. Seidel
Assistant Examiner—Chuck Y. Mah
Attorney, Agent, or Firm—Salzman & Levy

[57] ABSTRACT

The present invention features a fishing safety pouch for securing the lure and hooks of a fishing rod in a protected position and for simultaneously securing the fishing line in a taut condition to prevent fouling of the fishing line while the rod is being carried by the fishing sportman. The fishing safety pouch comprises a tough, non-abradable fabric having inner and outer surfaces defining a hollow envelope disposed therebetween. The fabric is foldable about a midportion thereof for folding and encasing the inner surface about a lure and hooks of the fishing line. A soft, flexible mat is disposed within the hollow envelope between the inner and outer surfaces of the fabric for providing a resilient feel throughout the entire outer surface of the fabric.

15 Claims, 2 Drawing Sheets

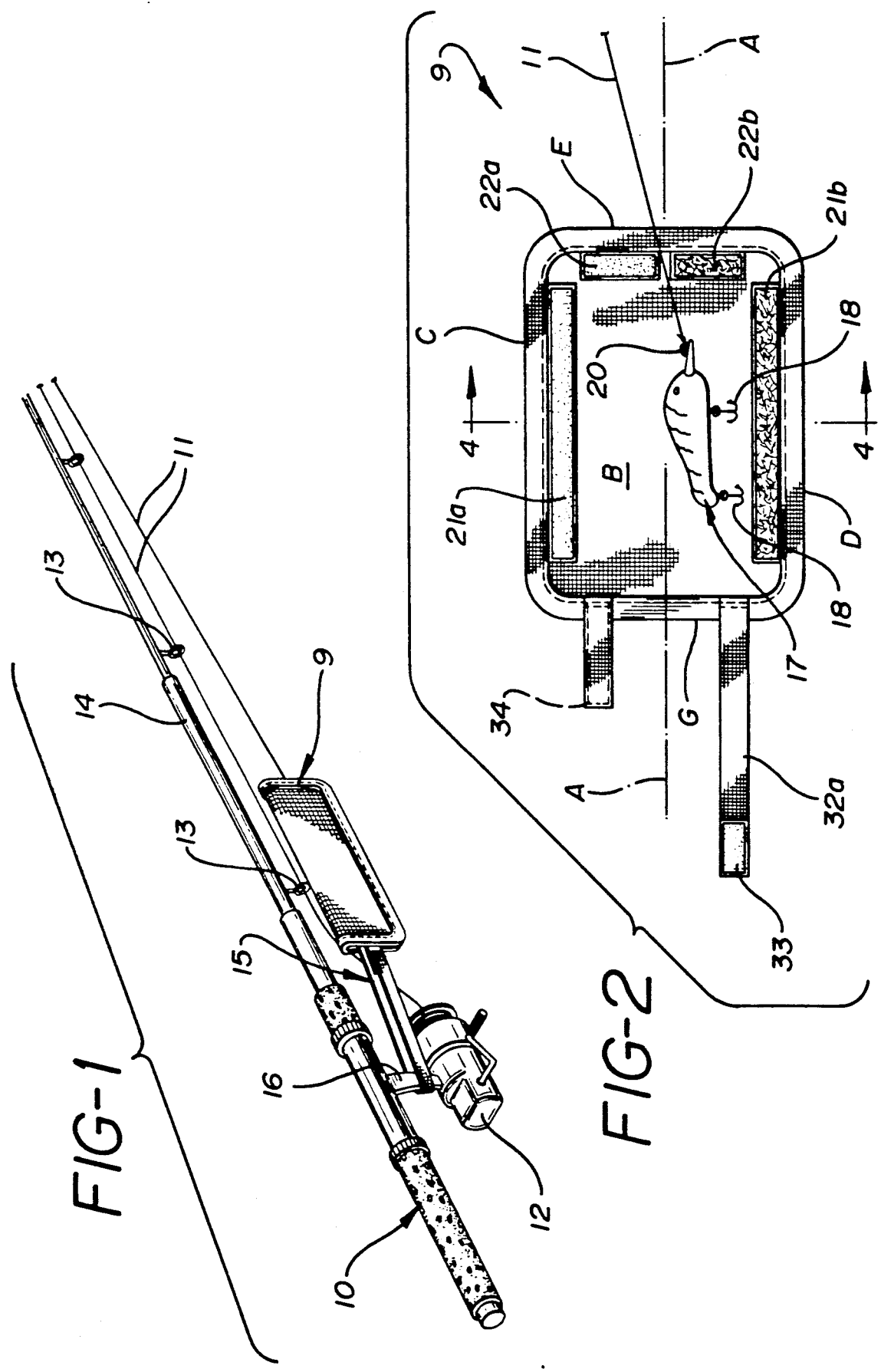

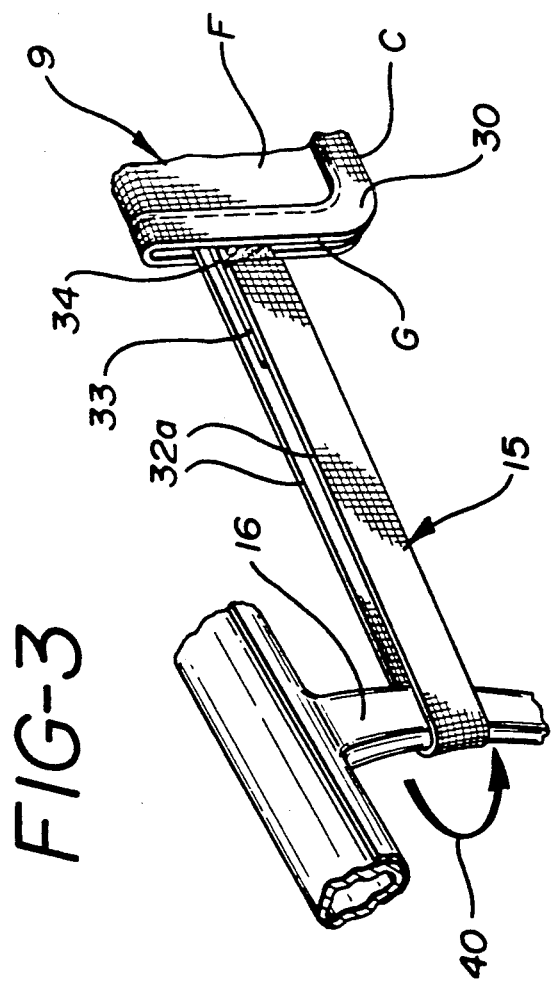
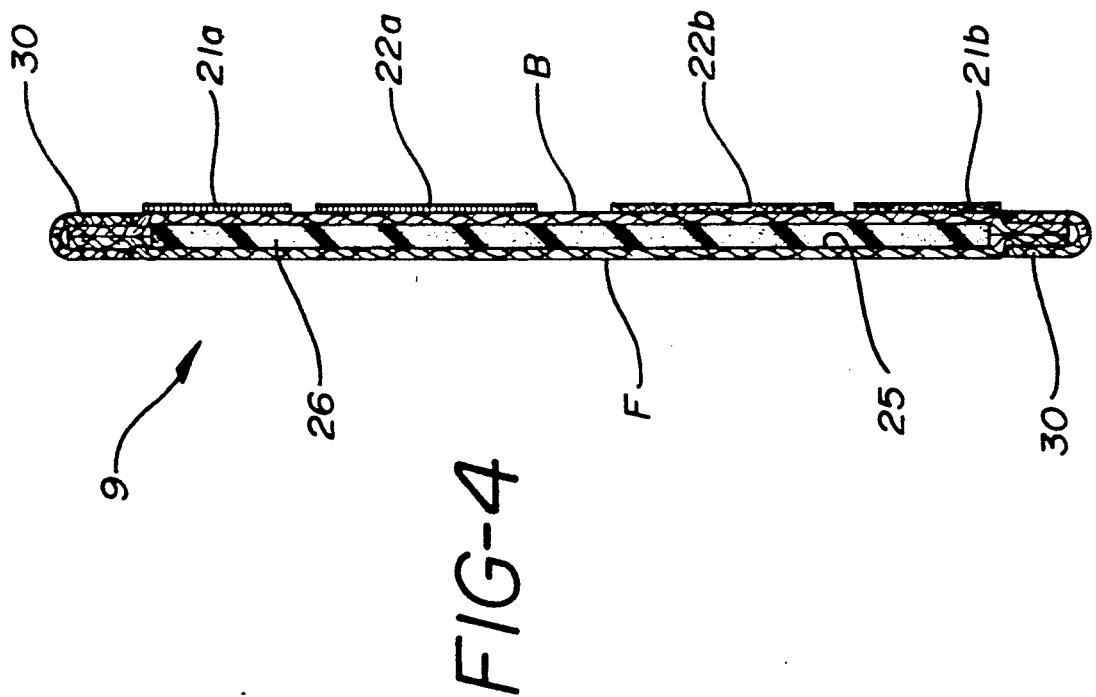

LURE AND HOOK SAFETY DEVICE

FIELD OF THE INVENTION

The invention relates to a pouch for housing the lure and hooks secured to the end of a fishing line, wherein the lure and hooks are easily stored while the fishing pole is carried by the fishing enthusiast, and more particularly to a safety storage pouch for protecting the lure and hooks attached to the fishing line. The pouch elastically attaches to the fishing reel of the fishing rod to hold the line taut, while the pouch folds about the lure and hooks. The pouch will not become disengaged from the fishing rod, while being easily removable from the lure and hooks during quick casting due to the elastic attachment to the fishing reel.

BACKGROUND OF THE INVENTION

In U.S. Pat. No. 4,418,490, issued to Ancona on Dec. 6, 1983, entitled "Fish Bait Protector," a foldover pouch for securing the bait about a fishing rod is illustrated. The pouch features a dichotomous pair of panels that fold and secure to each other by means of a peripheral Velcro fastener strip. The object of this invention is to keep the already baited materials on the rod fresh, free from fouling, and available for immediate use should the angler desire to cast.

The present invention provides all of the advantages of the aforementioned fish bait protector, but additionally provides many other advantages not contemplated in the patent.

In the fishing pouch of the above-mentioned patent, an angler anticipating a possible quick cast of the bait will unfold the pouch securing the bait, toss the pouch aside, and cast. In his haste, the pouch may drop to the floor of the boat or over the side. This is so because the pouch is securable to the fishing rod only in its folded state; once unfolded, it is free to become lost or damaged. The pouch, being a light, small item, is easily misplaced in the enthusiasm of the fishing activity.

Another disadvantage of the aforementioned patented device is the soft, abrading sponge used to protect the hooks. While the patent contemplates using a sponge to store water to keep the bait fresh, the sponge material is notoriously abradable. Hooks and other sharp edges of a lure will easily tear and scar this material. After a short time, the hooks and bait will cause unsightly rips extending to the outer liner material, thus impairing the pouch functionality.

Still another drawback of the aforesaid pouch is presented by the Velcro disposed intermittently along the periphery of the pouch liner. While the Velcro can provide excellent securement of the bifurcated leaves of the pouch, an inadequate quantity of Velcro about the peripheral edge causes a difficulty of secure adhesion, especially when thick, water-laden foam is used, increasing stress forces on the Velcro elements.

Still a further drawback of the patented device is the possibility for the fishing line and lure to become tangled or fouled while the pouch is folded about the fishing rod stem. No means are provided for tautly securing the fishing line while the hooks and bait are within the folded pouch.

By contrast, the present invention has improved the aforesaid pouch in a number of ways that make it more useful, safe, and functionally superior.

SUMMARY OF THE INVENTION

In accordance with the present invention, there is provided a fishing safety pouch for securing the lure and hooks of a fishing rod in a protected position, and for simultaneously securing the fishing line in a taut condition to prevent fouling of the fishing line while the rod is being carried by the fishing sportsman. The fishing safety pouch comprises a tough, non-abradable fabric having inner and outer surfaces defining a hollow envelope disposed therebetween. The tough fabric is strong enough to prevent penetration by fishing hooks attached to lures disposed in the pouch. The fabric is foldable about a midportion thereof for folding and encasing the inner surface about the lure and hooks of the fishing line. A soft, flexible mat is disposed within the hollow envelope between the inner and outer surfaces of the fabric for providing a resilient feel throughout the entire outer surface of the fabric. A plurality of securing strips disposed about a peripheral edge of the inner surface of the fabric secures the fabric in a folded position about its midportion. A resilient, stretchable fastener strip extends from the periphery of the fabric. The resilient, stretchable fastener strip has a first adhesion strip attachment disposed on a distal portion thereof. A rigid fastener strip extends from the periphery of the fabric adjacently juxtaposed to the resilient, stretchable fastener strip. The rigid fastener strip has a second adhesion strip attachment disposed on a distal portion that secures with the first adhesion strip attachment of said resilient, stretchable fastener strip to form a resilient, stretchable loop. The loop secures the fabric to a fishing reel of the fishing rod, while the fabric is folded over the lure and hooks of the fishing line. Thus, the resiliency and stretchability of the loop causes the fishing line to remain taut and unfouled while the lure and hooks remain protected by the folded, encasing fabric. The loop also prevents loss of the pouch when the fabric is unfolded.

BRIEF DESCRIPTION OF THE DRAWINGS

A complete understanding of the present invention may be obtained by reference to the accompanying drawings, when considered in conjunction with the subsequent detailed description, in which:

FIG. 1 illustrates an in situ, perspective view of the pouch device of this invention, whereby the pouch is shown in its folded state for securing and protecting the lure and hooks of the fishing line, while keeping the fishing line taut by virtue of the pouch attachment to the post of the fishing reel of the fishing rod;

FIG. 2 depicts a plan view of the pouch device of FIG. 1 in its unfolded state, just prior to its folding about the lure and hooks of the fishing line;

FIG. 3 is a partial, perspective view of the formation of the elastic fastener loop about the post of the fishing reel from the two extension strips of the pouch shown in FIG. 2; and FIG. 4 is a sectional view of the pouch device of FIG. 2, taken along lines A—A.

DESCRIPTION OF THE PREFERRED EMBODIMENT

Generally speaking, the invention features a protective pouch device for the lure and hooks of a fishing line, while the fishing rod is being transported by a sportsman or angler. The pouch device comprises a tough, non-abrading fabric article that folds about the lure and hooks attached to the fishing line, to protect them until needed for casting. The pouch has an elastic loop that secures it to the post of a fishing reel while it is folded over the lure and hooks. In this manner, the pouch keeps the fishing line taut and prevents fouling.

Now referring to FIG. 1, the pouch device 9 of this invention is shown in situ, in its folded condition about a lure and hooks (not shown) of a fishing line 11 of a fishing rod 10. The fishing line 11, in the usual condition, extends from the fishing reel 12 through the eyelets 13 of the casting rod 14. While being transported, the fishing line 11 is folded down past the last eyelet 13 (not shown), and is fed backwardly to the protective pouch 9.

The pouch 9 folds about and protects the lure and hooks, as will be explained hereinafter with reference to FIG. 2. After folding, the pouch 9 is elastically secured via an elastic loop 15 to the mounting post 16 of the fishing reel 12, as will be explained hereinafter with reference to FIG. 3.

The elastic loop 15 is also useful as a means to secure the pouch device 9 about a belt buckle or trouser belt loop. Used in this manner, the pouch 9 can be used to carry the lure and hooks when they are not attached to the fishing line 11.

Referring to FIG. 2, the pouch 9 is illustrated in its unfolded state, with the inner surface B facing the observer. A fishing lure 17, having two hooks 18 dangling therefrom, is attached via ring 20 to the end of the fishing line 11. The lure 17 is drawn downwardly from the last eyelet (not shown) on the end of the casting rod 14 of FIG. 1 to the vicinity of the fishing reel 12. The pouch 9 is then folded over the lure 17 and hooks 18 about a midportion demarcation line A, by bringing peripheral edges C and D together.

The pouch 9 is secured in the folded position by means of adhesion strips 21a, 22a, 21b and 22b, respectively integrally disposed about peripheral edges C, D, and E of pouch 9, as shown.

The adhesion strips 21a and 22a are the hooks or male portions of a Velcro strip, while the adhesion strips 21b and 22b are the loops or female portions of the Velcro for mating with the male portions. The strips 21a, 22a, 21b and 22b, respectively, circumscribe substantially the entire peripheral edge, so that the pouch 9 is not prone to separation during use and movement. Adhesion strips 22a and 22b provide not only a securing strip, but also a means for applying pressure on the nose or head of the lure 17 to help prevent the lure 17 from being pulled out of the pouch 9 when tension to the line 11 is present.

Referring to the sectional view of the pouch 9 shown in FIG. 4, the inner surface B of pouch 9 comprises water-proof marine polyester material, as is the outer surface F. This material is resistant to puncture or penetration of fishing hooks 18 (FIG. 2) on lure 17. The inner surface B and outer surface F are joined together to form an inner envelope 25 that is filled with a soft, resilient mat 26 comprising a pad of polyester or foam material. The entire periphery of the pouch 9 is protected by a wear-resistant strip 30 comprising a tough plastic or leather material to prevent fraying of the edges of the pouch.

Referring again to FIG. 2, two extension strips 32a and 34 are shown projecting from peripheral edge G of pouch 9. Strip 32a comprises an elastic, rubberized fabric, while strip 34 comprises a female adhesion surface of Velcro loops. Strip 32a has a male adhesion surface 33 of Velcro hooks that mates and secures with the female Velcro loops 34. When the mating surfaces 33 and 34 are brought together (arrow 40), as shown in FIG. 3, the strips 32a and 34 form the elastic loop 15, as shown in FIGS. 1 and 3.

The two strips 32a and 34, respectively, are joined together to form loop 15 as aforementioned, when the pouch 9 has been folded about lure 17 and hooks 18. The strips 32a and 34 are joined together about the mounting post 16 of the fishing reel 12 to form loop 15, as shown in FIG. 3.

The elastic loop 15 puts tension on the fishing line 11 when wrapped about mounting post 16, keeping the fishing line 11 taut and preventing the fishing line 11 from becoming fouled.

The inner surface B of pouch 9, comprising a non-abrading, water-proof material such as a marine polyester fabric, ensures that the hooks 18 will not scratch or mar the pouch 9. The loop 15 makes possible the use of pouch 9 as a portable bait or hook bag. By forming loop 15 about a belt buckle or trouser belt loop when the lure 17 is not attached to fishing line 11, the pouch 9 can be carried upon one's person and can be folded to secure and carry hooks, lures, bait, etc.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the current invention, what is desired to be protected by Letters Patent is presented by the subsequently appended claims.

What is claimed is:

1. A fishing safety pouch for securing the lure and hooks of a fishing rod in a protected position and for simultaneously securing the fishing line in a taut condition to prevent fouling of the fishing line while the rod is being carried by the fishing sportsman, said fishing safety pouch comprising:

a tough, non-abradable fabric having inner and outer surfaces defining a hollow envelope disposed therebetween, said fabric being foldable about a midportion thereof for folding and encasing said inner surface about a lure and hook of said fishing line;

a soft, flexible mat disposed within the hollow envelope between said inner and outer surfaces of the fabric for providing a resilient feel throughout the entire outer surface of said fabric;

a plurality of securing strips disposed about a peripheral edge of said inner surface of said fabric for securing said fabric in a folded position about its midportion;

a resilient, stretchable fastener strip extending from the periphery of said fabric and having a first attachment means disposed on a distal portion thereof; and a second strip extending from the periphery of said fabric adjacently juxtaposed to said resilient, stretchable fastener strip, said second strip having a second attachment means disposed thereon that secures with the first attachment means of said resilient, stretchable fastener strip to form a resilient, stretchable loop for securing said fabric to a fishing reel of said fishing rod while said fabric is folded over said lure and hook of said fishing line, whereby the resiliency and stretchability of said loop causes said fishing line to remain taut and unfouled while said lure and hook remain protected by the folded, encasing fabric.

2. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 1, wherein two male adhesion securing strips are disposed on one side of a demarcation defining said folded position about its midportion, and two female adhesion securing strips are disposed on an opposite side of said folded position about its midportion, said male and female adhesion securing strips mating with each other to secure the fabric in pouch-like fashion.

3. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 1, further comprising a tough liner extending substantially about the entire periphery of said fabric to prevent fraying of the edge of said fabric.

4. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 1, wherein said soft, flexible mat comprises a pad of polyester material.

5. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 1, wherein said tough, non-abradable fabric comprises a water-proof, marine polyester material.

6. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 1, wherein said first and second attachment means comprises mating male and female adhesion strips, respectively.

7. A fishing safety pouch for securing the lure and hooks of a fishing rod in a protected position and for simultaneously securing the fishing line in a taut condition to prevent fouling of the fishing line while the rod is being carried by the fishing sportsman, said fishing safety pouch comprising:
   a tough, non-abradable fabric having inner and outer surfaces defining a hollow envelope disposed therebetween, said fabric being foldable about a demarcation defining a midportion fold thereof for folding and encasing said inner surface about a lure and hook of said fishing line;
   a soft, flexible mat disposed within the hollow envelope between said inner and outer surfaces of the fabric for providing a resilient feel throughout the entire outer surface of said fabric;
   a plurality of securing strips disposed about a peripheral edge of said inner surface of said fabric for securing said fabric in a folded position about its midportion, said plurality of securing strips further comprising two male adhesion securing strips disposed on one side of said demarcation defining said midportion fold and two female adhesion securing strips disposed on an opposite side of said midportion fold, said male and female adhesion securing strips mating with each other to secure the fabric in pouch-like fashion;
   a resilient, stretchable fastener strip extending from the periphery of said fabric and having a first attachment means disposed on a distal portion thereof; and
   a second strip extending from the periphery of said fabric adjacently juxtaposed to said resilient, stretchable fastener strip, said second strip having a second attachment means disposed on a distal portion that secures with the first attachment means of said resilient, stretchable fastener strip to form a resilient, stretchable loop for securing said fabric to a fishing reel of said fishing rod while said fabric is folded over said lure and hook of said fishing line, whereby the resiliency and stretchability of said loop causes said fishing line to remain taut and unfouled while said lure and hook remain protected by the folded, encasing fabric.

8. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 7, further comprising a tough liner extending substantially about the entire periphery of said fabric to prevent fraying of the edge of said fabric.

9. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 7, wherein said soft, flexible mat comprises a pad of polyester material.

10. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 7, wherein said tough, non-abradable fabric comprises a water-proof, marine polyester material.

11. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 7, wherein said first and second attachment means comprises mating male and female adhesion strips, respectively.

12. A fishing safety pouch for securing the lure and hooks of a fishing rod in a protected position and for simultaneously securing the fishing line in a taut condition to prevent fouling of the fishing line while the rod is being carried by the fishing sportsman, said fishing safety pouch comprising:
   a tough, non-abradable fabric having inner and outer surfaces defining a hollow envelope disposed therebetween, said fabric being foldable about a demarcation defining a midportion fold thereof for folding and encasing said inner surface about a lure and hook of said fishing line;
   a soft, flexible mat disposed within the hollow envelope between said inner and outer surfaces of the fabric for providing a resilient feel throughout the entire outer surface of said fabric;

a plurality of securing strips disposed about a peripheral edge of said inner surface of said fabric for securing said fabric in a folded position about its midportion, said plurality of securing strips further comprising two male adhesion securing strips disposed on one side of said demarcation defining said midportion fold and two female adhesion securing strips disposed on an opposite side of said midportion fold, said male and female adhesion securing strips mating with each other to secure the fabric in pouch-like fashion;

a resilient, stretchable fastener strip extending from the periphery of said fabric and having a first attachment means comprising an adhesion strip disposed on a distal portion thereof; and a second strip extending from the periphery of said fabric adjacently juxtaposed to said resilient, stretchable fastener strip, said second strip having a second attachment means comprising a female adhesion strip disposed thereon that secures with the first attachment means of said resilient, stretchable fastener strip to form a resilient, stretchable loop for securing said fabric to a fishing reel of said fishing rod while said fabric is folded over said lure and hook of said fishing line, whereby the resiliency and stretchability of said loop causes said fishing line to remain taut and unfouled while said lure and hook remain protected by the folded, encasing fabric.

13. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 12, further comprising a tough liner extending substantially about the entire periphery of said fabric to prevent fraying of the edge of said fabric.

14. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 12, wherein said soft, flexible mat comprises a pad of polyester material.

15. A fishing safety pouch for securing the lure and hooks of a fishing rod in an inaccessible position and for simultaneously securing the fishing line in a taut condition to prevent fouling of the fishing line while the rod is being carried by the fishing sportsman in accordance with claim 12, wherein said tough, non-abradable fabric comprises a water-proof, marine polyester material.

* * * * *